Nov. 4, 1969    M. A. MENDELSOHN    3,476,933
LARGE-CELLED POLYURETHANE FOAM
Filed Oct. 21, 1966

WITNESSES
Theodore F. Wrobel
Lee P. Johns

INVENTOR
Morris A. Mendelsohn
BY Frederick Shapoe
ATTORNEY

United States Patent Office 3,476,933
Patented Nov. 4, 1969

3,476,933
LARGE-CELLED POLYURETHANE FOAM
Morris A. Mendelsohn, Pittsburgh, Pa., assignor to Westinghouse Electric Corporation, Pittsburgh, Pa., a corporation of Pennsylvania
Filed Oct. 21, 1966, Ser. No. 588,529
Int. Cl. C08g 22/44
U.S. Cl. 260—2.5                                                                  11 Claims

ABSTRACT OF THE DISCLOSURE

A uniform large celled polyether urethane foam and process for preparing same, the foam comprising a network of ligaments forming discrete cells having planar openings between adjacent cells, the average number of cells per linear inch being in the range of from less than five to not more than twenty, the foam being a product of a reaction of a polyether polyol having a molecular weight ranging from 800 to 3000 and a polyol having a molecular weight of less than 195 with a mixture of a polymethylene polyphenyl isocyanate and a tolylene diisocyanate with at least one of an amine type catalyst and a metallic salt catalyst together with an organic fatty acid, a silicone surfactant, and a blowing agent.

---

This invention relates to polyether-urethane foams and pertains to methods for making such foams having a large cell structure and moderately uniform cell size.

In recent years, polyurethane products such as cellular foam have met with increased demand for a variety of uses. For some purposes, the foam may be of a closed celled structure for use as insulation. For other purposes, the foam may be of open celled structure in which some of the cell membranes are ruptured. For still other purposes there are structures in which there is an almost complete absence of cell membranes such as for filter purposes.

Foamed or cellular polyurethane products are conventionally made by reacting an organic isocyanate, e.g. a polyisocyanate, with a polyol or a hydroxy terminated polyester, various other materials such as blowing agents, catalysts, and the like. During the reaction, a gas or vapor is generated while the reaction mixture is in a plastic or fluid state. As the gas generates, a formation of bubbles permeates the reaction mixture. As the bubbles expand, cells are formed and the resulting structure of the material is comprised of a skeletal structure and cell membranes. Such material is a closed cell structure. An open celled structure may be obtained by removal of the cell membrane in a manner well known in the art such as the use of sodium hydroxide as a hydrolyzing agent or by light pulse heating such as disclosed in U.S. Patent No. 3,175,030, or by permeating the foam with a combustible gaseous mixture which is ignited so as to destroy the cell diaphragms and yet permit most of the skeletal structure to remain.

One disadvantage of the most of the known methods for preparing foamed polyurethane structures has been the lack of control over the size of the resulting cell. Most of the prior procedures have provided a foam characterized by small cells such as greater than 20 cells per inch, or in a foam having a nonuniform cell size. For some purposes, the foam having a small cell size or non-uniform size is satisfactory. However, where the foam is used in a heat exchanger such as for cooling water in a cooling tower as disclosed in a copending application Ser. No. 566,296 filed July 19, 1966 (now abandoned), a uniformly large celled structure is necessary to prevent water from being trapped in the cells which occurs where very small cell structures are used or where non-uniform cell sizes exist. Associated with the foregoing is the problem of hydrolytic stability of polyurethane foam when used continuously in water such a filter for insoluble materials. Polyester-urethane foams contain polyester chains which are readily susceptible to hydrolysis and therefore deteriorate over a period of continued use. However, polyether urethane foams, being devoid of the polyester chain segments, are not readily hydrolyzed and are therefore readily adapted for use in contact with water over extended periods of time. For example, polyether foams may be employed as packing in water cooling tower installations.

In accordance with the invention, it has been found that unusually large celled polyurethane foam having from 5 to 20 cells per inch may be provided in accordance with a preferred procedure and formulation of components. Moreover, it has been found that polyether-urethane foam having excellent hydrolytic stability may be provided with a large celled structure and uniform cell size.

Accordingly, it is a general object of this invention to provide a large celled polyurethane foam having from 5 to 20 cells per inch.

It is another object of this invention to provide a large celled polyurethane foam having almost complete uniformity of cell size.

It is another object of this invention to provide a large cell polyurethane foam having a very good hydrolytic stability.

Finally, it is an object of this invention to satisfy the foregoing objects and advantages in a simple and effective manner.

Briefly, the present invention consists of a method for making a uniformly large celled polyether urethane foam which comprises reacting a polyether polyol having a molecular weight ranging from 800 to 3000 and a polyol having a molecular weight of less than 195 with a mixture of a polymethylene polyphenyl isocyanate and a tolylene diisocyanate in the presence of at least one of an amine type catalyst and a metallic salt catalyst together with an organic fatty acid, a silicone surfactant, and a blowing agent such as water and/or trichlorofluoromethane.

For a better understanding of the nature and objects of this invention, reference is made to the drawings, in which.

Figure 1:
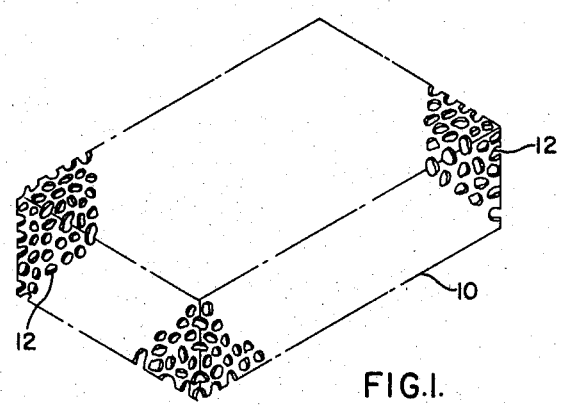
FIGURE 1 is a perspective view of a reticulated large celled polyurethane object.

In FIG. 1, a block or slab 10 of polyurethane foam is illustrated. It is composed of an open celled reticulated foraminous material having a plurality of cells or voids 12 disposed between solid portions or ligaments of the material. The block 10 may be closed celled (FIG. 2) or open celled (FIG. 3).

Figure 2:
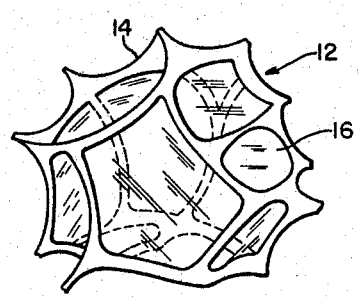
FIG. 2 is an enlarged perspective view of a typical cell of the block of foam shown in FIG. 1, illustrating the skeletal structure and the cell membranes.

In FIG. 2, an individual cell 12 is disposed in a polyurethane cellular material which consists of a skeletal structure including ligaments 14 and cell membranes 16. For some purposes such as insulation, the closed celled structure of FIG. 2 is preferred. For other purposes such as filtering fluids, an open celled structure is used. As shown in FIG. 3, an individual cell 12 of polyurethane cellular material is illustrated and consists of a skeletal structure 14 without cell membranes whereby communication between individual adjacent cells 12 is possible.

Figure 3:
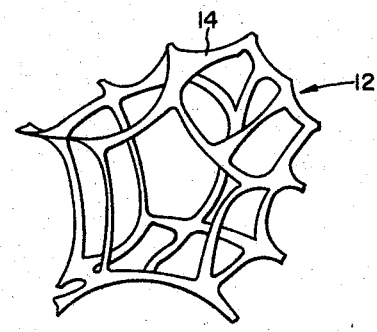
FIG. 3 is an enlarged perspective view of the individual cell illustrating the skeletal structure shown in FIG. 1 after removal of the cell membranes.

The cell structure of FIG. 3 represents the cell 12 after complete reticulation; that is, removal of the cell membrane 16 of FIG. 2. Where an open celled structure such as that shown in FIG. 3 is desired, the closed celled structure of FIG. 2 represents an intermediate stage in the production of the open celled structure. As was indicated above, the open celled reticulated material may be obtained by various methods shown in the art such as by subjecting the closed celled structure of FIG. 2 to a light pulse of sufficient intensity of energy to evaporate or burn away the membrane 16 to produce the reticulated material.

The solid portion or ligament 14 of the foam is composed of a polyether-urethane material which is derived from a reaction of the following essential ingredients:

neutralized by the free acids present in one gram of a sample. A typical organic acid is trimer acid which is produced by homopolymerization of unsaturated $C_{18}$ fatty acids, as is well known, to produce compounds with a high percentage of compounds with an average of 54 carbon atoms and having an average of at least one unsaturated group in the molecule. Other acids that may be used are listed in Table II.

TABLE II

| Acid | Composition | Acid Value |
| --- | --- | --- |
| Tricarboxylic Acid (A) | ~90% C-54 tricarboxylic acids; ~5% C-36 dicarboxylic acids; ~5% C-18 monobasic acid. | 183–191 |
| Azelaic Acid (Commercial) | 85–90% $C_7H_{14}(COOH)_2$; 10–15% other dibasic acids; 17% monobasic acid. | 560–575 |
| Oleic Acid | $C_8H_{17}CHCH(CH_2)_7COOH$ | 197–202 |
| Tall Oil | Mixture of fatty acids (above 6 C atoms) | 185–191 |
| Dicarboxylic Acids | 95% C-36 dibasic acids; 4% C-54 triboxylic acids. | 188–193 |
| Pelargonic Acids | Pelargonic acid (94.5%) $C_8H_{17}COOH$; Caprylic acid (4%) $C_7H_{15}COOH$; Capric acid (1.5%) $C_9H_{19}COOH$. | 345–355 |
| Tricarboxylic Acids (B) | 90% C-54 tricarboxylic acids; 10% dicarboxylic aicds. | 198 |
| Fractionated Tall Fatty Acid | >97% mixture of unsaturated fatty acids (above 6 C atoms); 1.5% max. rosin acids. | 196 |
| Do | >92% fatty acids (above 6 C atoms); 3–6% rosin acids. | 194–199 |
| Distilled Tall Oil | ~75% fatty acids (above 6 C atoms); ~25% rosin acids. | 196 |
| Tall Oil Fatty Acids | 4–5% rosin acids; ~94% fatty acids (above 6 C atoms). | 195 |

Ingredients: Range by weight
(1) Liquid polyol of a relatively high average molecular weight _____ 30 to 70
(2) Unsaturated organic fatty acid _____ 2 to 20
(3) Amine type catalyst _____ (¹)
(4) Polyol of low molecular weight _____ 3 to 10
(5) Water or foaming agent _____ Up to 1.0
(6) Metal salt catalyst _____ (¹)
(7) Polycyclic aromatic polyisocyanate ____ 2 to 20
(8) Tolylene diisocyanate _____ 10 to 60
(9) Surfactant _____ Up to 1.0

¹ Amine type and metallic salt catalysts total up to about 2 parts.

The polyol (1) has a high average molecular weight ranging from 800 to 3000. The preferred polyol is a propylene oxide derivative of trimethylol propane, or of a low molecular weight polyhydric hydrocarbon alcohol such as glycerol, 1,2,6-hexanetriol, and dipropylene glycol or a mixture of two or more. Their molecular weights should be in the range of 800 to 3000, but the preferred molecular weight for the polyol is about 1500, with a hydroxyl number of approximately 110, and a viscosity at 25° C. of about 290 cps.

Examples of other high average molecular weight polyols that may be used are:

TABLE I

| Polyol | Approximate Avg. mol. wt. | Approximate Hydroxyl Number | Approximate Viscosity, cps. |
| --- | --- | --- | --- |
| Propylene oxide adduct of trimethylol propane. | 2,673 | 63 | 440 at 25° C. |
| Polyoxypropylene adduct of 1,2,6-hexanetriol. | 2,500 | 67 | 526 at 20° C. |
| Do | 1,500 | 112 | 397 at 20° C. |
| Polyoxypropylene adduct of glycerol. | 1,000 | 168 | 319 at 20° C. |
| Do | 2,700 | 63 | |
| Do | 1,080 | 156 | |

Where polyoxypropylene triols having very high molecular weights above 3000 or more are used, an undesirable fine cellular structure results. Similarly, it a triol of very low molecular weight substantially below 800 is used, a very fine cellular structure results which is undesirable for the purpose of this invention.

The unsaturated organic acids (2) having an average of at least 6 carbon atoms and have acid values of from about 170 to about 600. The acid value is the number of milligrams of normal potassium hydroxide that are The amine catalyst (3) is used to expedite the reaction of the isocyanates with water and the polyols and the organic acids. One or more of amine type catalysts suitable for use in the reaction may be employed. Table III lists several suitable amine type catalysts.

TABLE III

Catalyst monoethanolamine
diethanolamine
triethanolamine
N,N-dimethyl ethanolamine
N,N-diethyl ethanolamine
N-(2-aminoethyl) ethanolamine
N-methyl diethanolamine
monoisopropanolamine
diisopropanolamine
triisopropanolamine
mixed isopropanolamines
morpholine
N-methyl morpholine
N-ethyl morpholine
N-phenyl morpholine
N-methyl ethanolamine
N-ethyl diethanolamine
N-butyl ethanolamine
N,N-dibutyl ethanolamine
N,N-di(2-ethylhexyl) ethanolamine
N,N-dibutyl isopropanolamine
N,N-diisopropyl ethanolamine
N-(2-aminoethyl)morpholine
2,6-dimethyl morpholine
N-phenyl ethanolamine
N-phenyl diethanolamine
N,N-phenyl ethyl ethanolamine
N-(2-hydroxyethyl)morpholine
1-methyl-4-(dimethylaminoethyl)piperazine
N-ethylethylenimine
N,N,N',N'-tetramethylethylene-diamine
2,4,6-tri(dimethylaminomethyl)phenol
diethylcyclohexylamine
lauryldimethylamine
tetrakis-(2-hydroxypropyl)ethylenediamine
bis(2-hydroxypropyl)-2-methylpiperzine
2,2,2-diazabicyclooctane (triethylenediamine)
1,2,4-trimethylpiperazine
N-cocomorpholine
triethylamine
N,N,N',N'-tetramethyl-1,4-butane-diamine The preferred amine type catalyst is N-ethyl morpholine.

The polyols (4) of low molecular weight must have at least two carbon atoms, and from two to six oxygen atoms. At least two of the oxygen atoms must be attached to both a carbon and a hydrogen atom to provide hydroxyl groups bonded to carbon. The preferred range of the molecular weight of the polyols is from about 62 to 195. The polyol (4) can be di, tri, or tetra functional. Typical polyols of low molecular weight are listed in Table IV.

TABLE IV

| | |
|---|---|
| ethylene glycol | 1,2,6-hexanetriol |
| diethylene glycol | 1,5-pentanediol |
| triethylene glycol | 1,4-butanediol |
| tetraethylene glycol | 1,3-butanediol |
| propylene glycol | 1,2-butanediol |
| dipropylene glycol | 2,2-butanediol |
| trimethylene glycol | 2,3-butanediol |
| hexylene glycol | neopentyl glycol |
| 2-ethyl-1,3-hexanediol | 1,1,1-trimethylol ethane |
| glycerol | 1,1,1-trimethylol propane |
| pentaerythritol | 1,4-cyclohexanedimethanol | and any isomeric polyol, and mixtures of two or more thereof.

The metal salt catalyst (6) has the primary function of expediting the reaction between the polyols and the polyisocyanates. The metal salt catalyst may be employed individually or in combination of two or more such metal salts. Typical catalysts are listed in Table V.

TABLE V

| | |
|---|---|
| bismuth nitrate | feric chloride |
| lead 2-ethylhexoate | feric 2-ethylhexoate |
| lead benzoate | feric acetylacetonate |
| sodium trichlorophenate | antimony trichloride |
| sodium propionate | antimony pantachloride |
| lithium acetate | triphenylantimony dichloride |
| potassium oleate | |
| tributyltin chloride | uranyl nitrate |
| dibutyltin chloride | cadmium nitrate |
| butyltin trichloride | cadmium diethyldithiophosphate |
| stannic chloride | |
| tributyltin o-phenylphenate | cobalt benzoate |
| stannous octoate | cobalt 2-ethylhexoate |
| stannous oleate | thorium nitrate |
| dibutyltin di(2-ethyl-hexoate) | triphenylaluminum |
| | trioctylaluminum |
| dibenzyltin di(2-ethyl-hexoate) | aluminum oleate |
| | diphenylmercury |
| dibutyltin dilaurate | zinc 2-ethylhexoate |
| dibutyltin diisooctylmaleate | zinc naphthenate |
| dibutyltin sulfide | nickelocene |
| dibutyltin dibutoxide | nickel naphthenate |
| dibutyltin bis (o-phenylphenate) | molybdenum hexacarbonyl |
| | cerium nitrate |
| dibutyltin bis(acetylacetonate) | vanadium trichloride |
| | cupric 2-ethylhexoate |
| di(2-ethylhexyl) tin oxide | cupric acetate |
| titanium tetrachloride | lead oleate |
| dibutyltitanium dichloride | manganese 2-ethylhexoate |
| tetrabutyl titanate | sodium o-phenylphenate |
| butoxytitanium trichloride | tetra(2-ethylhexyl)titanate |

The polycyclic aromatic polyisocyanate (7) preferably is a polymethylene polyphenylisocyanate having an average functionality of about 2.75. The isocyanate equivalent weight is approximately 133. The phenyl groups are connected by methylene bridges to one another. The isocyanate groups are attached to the phenyl groups. Commercially this polyisocyanate is not a pure chemical compound but is a mixture of compounds that comes under the above description and has a typical formula as follows:

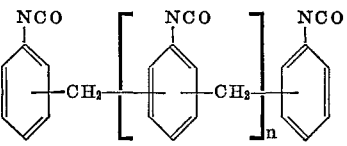

where $n \geq 0$.

The tolylene diisocyanate (8) suitable for practicing the invention may consist of one of the following compounds or mixtures:

TABLE VI (a) ~80% 2,4-tolylene diisocyanate and balance 2,6-tolylene diisocyanate;
(b) ~65% 2,4-tolylene diisocyanate and ~35% 2,6-tolylene diisocyanate;
(c) ~100% 2,4-tolylene diisocyanate; or
(d) ~100% 2,6-tolylene diisocyanate.

The polycyclic aromatic polyisocyanate and tolylene diisocyanate are preferably used in admixtures with each other, though good results are had when they are separately added to the reaction mixture. The two isocyanates (7) and (8) cooperate to achieve excellent large-celled foams.

Tolylene diisocyanate alone results in flexible foams with good properties. It has been found, however, that the additoin of the polycyclic aromatic polyisocyanate which has a functionality of greater than 2, causes the foam to set up faster during its formation while the foam is rising. With large cells there is a problem of instability, and the polycyclic polyisocyanate causes the foam to set up faster and thus produces stability. Moreover, polycyclic polyisocyanate alleviates foam shrinkage that normally occurs after setting up and also increases foam rigidity.

A surfactant (9) is used to facilitate the cell development during formation of foam. A dimethylpolysiloxane surfactant containing no alkoxy groups is preferred because the latter tend to result in smaller celled foam. Suitable surfactants may have a wide range of viscosity ranging from 0.65 to 30,000 centistokes at 25° C. The surfactant used in the examples set forth below had a viscosity of about 50 centistokes.

In addition, siloxanes may be used such as

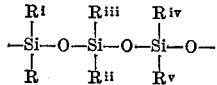

where the R groups represent not only methyl but other alkyl groups such as ethyl, propyl, butyl, etc. However, aryl groups such as phenyl, benzyl and tolyl, may also be used.

The water (5) may be replaced either wholly or partially by a volatile halogenated hydrocarbon such as trichlorofluoromethane as a foaming agent. The water or trichlorofluoromethane may be used either separately or in combination.

The foregoing nine ingredients constitute the basic necessary components for providing a large celled polyetherurethane foam. In addition, mineral oil may be added to the above basic ingredients. Mineral oil effects the nucleation in such a manner that it possibly reduces the number of nuclei of cells formed for a given volume of gas; i.e., carbon dioxide which produces the foam texture.

Moreover, hydroquinone may be added as an antioxidant to prevent scorching of the foam as it rises during formation.

The following examples are illustrative of the present invention.

EXAMPLE 1

A one-shot polyether urthane foam was prepared using a Martin Sweets Low Pressure High Shear foam machine. The four streams shown below were fed simultaneously to the mixing head of the foam machine and mixed at 8000 r.p.m. and the product was then discharged into an open mold. Within 3 minutes of the discharge, the mixed liquid greatly expanded and solidified to give the large celled foam.

FORMULATION (PARTS BY WEIGHT)

| Stream | Total Parts of Stream | Composition of Streams Components | Parts |
|---|---|---|---|
| 1 | 60.1 | Polyoxypropylene adduct of trimethylol propane. | 50 |
|   |      | Tricarboxylic acids | 10 |
|   |      | N-ethylmorpholine | 0.1 |
|   |      | Mineral Oil | 1.0 |
|   |      | Ethylene Glycol | 5.0 |
| 2 | 6.4 | Water | 0.4 |
|   |      | Hydroquinone | 1.0 |
| 3 | 0.5 | Stannous Octoate | 0.5 |
| 4 | 33 | Polymethylene Polyphenylisocyanate | 6 |
|   |      | Tolylene Diisocyanate—(a) Table VI | 28 |
|   |      | Blowing Agent (Trichlorofluoromethane) | 2 |
|   |      | Silicone Surfactant, 50 cstks. viscosity, dimethyl polysiloxane. | 0.006 |

The resultant foam had large and fairly uniform cells (about 90% of the cells were in the size range from ⅛ inch to 1/12 inch).

EXAMPLE 2

A foam (8–12 cells per inch) similar to that of Example 1 was prepared according to the following formulation.

| Stream | Total Parts of Stream | Composition of Streams Components | Parts |
|---|---|---|---|
| 1 | 30.05 | Polyoxypropylene adduct of trimethylol propane. | 5 |
|   |        | Tricarboxylic acids | 1 |
|   |        | N-ethylmorpholine | 0.01 |
|   |        | Ethylene Glycol | 3.0 |
| 2 | 3.85 | Water | 0.35 |
|   |       | Hydroquinone | 0.50 |
| 3 | 0.30 | Tall oil Fatty Acids | 1.0 |
|   |       | Stannous Octoate | 1.0 |
| 4 | 18 | Polymethylene Polyphenylisocyanate | 1 |
|   |     | Tolylene Diisocyanate—(a) Table VI | 5 |
|   |     | 10% solution of silicone surfactant in toluene, 50 cstks. viscosity, dimethyl polysiloxane. | 0.03 |

EXAMPLE 3

A foam having somewhat finer cell structure (about 90% of all structure was in the range of 12–18 cells per inch) was prepared from the following formulation.

| Stream | Total Parts of Stream | Composition of Streams Components | Parts |
|---|---|---|---|
| 1 | 60.1 | Polyoxypropylene adduct of trimethylol propane. | 50 |
|   |       | Tricarboxylic Acids | 10 |
|   |       | N-ethylmorpholine | 0.1 |
|   |       | Ethylene Glycol | 5.0 |
| 2 | 6.4 | Water | 0.4 |
|   |      | Hydroquinone | 1.0 |
| 3 | 0.25 | Stannous Octoate | 0.25 |
| 4 | 33 | Polymethylene Polyphenylisocyanate | 6 |
|   |     | Tolylene Diisocyanate—(a) Table VI | 28 |
|   |     | Trichlorofluoromethane | 3 |
|   |     | Silicone Surfactant, 50 cstks. viscosity, dimethyl polysiloxane. | 0.03 |

EXAMPLE 4

A very good appearing foam (8 to 12 cells per inch) was prepared by a formulation that utilized greater quantities of the fourth stream and higher concentrations of N-ethylmorpholine, stannous octoate, and fluorocarbon blowing agent than those depicted in Example 1.

| Stream | Total Parts of Stream | Composition of Streams Components | Parts |
|---|---|---|---|
| 1 | 60.1 | Polyoxypropylene adduct of trimethylol propane. | 50 |
|   |       | Tricarboxylic Acids | 10 |
|   |       | N-ethylmorpholine | 0.1 |
|   |       | Ethylene Glycol | 5.0 |
| 2 | 6.6 | Water | 0.4 |
|   |      | Hydroquinone | 1.0 |
|   |      | N-ethylmorpholine | 0.2 |
| 3 | 0.75 | Stannous Octoate | 0.75 |
| 4 | 37 | Polymethylene Polyphenylisocyanate | 6 |
|   |     | Tolylene Diisocyanate—(a) Table VI | 28 |
|   |     | Trichlorofluoromethane | 3 |
|   |     | Silicone Surfactant, 50 cstks. viscosity, dimethyl polysiloxane. | 0.01 |

EXAMPLE 5

A large celled foam (5–11 cells per inch) was prepared using dimethylsulfoxide as an anti-nucleating agent.

| Stream | Total Parts of Stream | Composition of Streams Components | Parts |
|---|---|---|---|
| 1 | 60.1 | Polyoxypropylene adduct of trimethylol propane. | 50 |
|   |       | Tricarboxylic Acids | 10 |
|   |       | N-ethylmorpholine | 0.1 |
|   |       | Ethylene Glycol | 5.0 |
| 2 | 6.85 | Water | 0.4 |
|   |       | Hydroquinone | 1.0 |
|   |       | N-ethylmorpholine | 0.2 |
|   |       | Dimethylsulfoxide | 0.25 |
| 3 | 1.0 | Stannous Octoate | 1.0 |
| 4 | 37 | Polymethylene Polyphenylisocyanate | 6 |
|   |     | Tolylene Diisocyanate—(a) Table VI | 28 |
|   |     | Trichlorofluoromethane | 3 |
|   |     | Silicone Surfactant, 50 cstks. viscosity, dimethyl. | 0.03 |

EXAMPLE 6

The cell size of a foam is regulated to some extent by the quantity of silicone surfactant employed. A foam having about 15–20 cells per inch was prepared by using the same formulation as that shown in Example 1 except that the quantity of silicone surfactant solution was quadrupled.

The foams that were prepared in the foregoing examples had cell diaphragms, or membranes 16 as shown in FIG. 2. However, if an open celled foam without membranes is the desired end product, then the diaphragm or membranes 16 are removed by treating the foam by various means such as dielectric heating, caustic etch, liquid oxidizing agents, gaseous oxidizing agents, intense light (as in Patent No. 3,175,030), flash burning (as in Patent No. 3,175,025), and sandblasting, etc.

Though the procedures of the foregoing Examples 1 to 6 were performed by using a low pressure, high shear foam machine of the Martin Sweets Co., Inc., of Louisville, foams having suitable coarse texture, i.e., large cells, may be prepared by manually pouring and mixing the ingredients in an open container.

One procedure for removing membranes 16 from polyether polyurethane foams involves the use of an oxidizing reagent. For example, (a) sulfuric acid solutions of chromic acid or (b) potassium permanganate in water or aqueous sodium hydroxide were found to dissolve the membranes with the desired production of a reticulated foam. Typical compositions of the diaphragm removing reagents are:

(1)                                                    Percent
$H_2SO_4$ by weight (93% $H_2SO_4$) _____ 53.3
$CrO_3$ by weight _____ 13.3
$H_2O$ _____ 33.3

(2)
NaOH by weight _____ 13.8
$KMnO_4$ by weight _____ 13.8
$H_2O$ _____ 75.2

(3)
$KMnO_4$ by weight _____ 20
$H_2O$ _____ 80

The closed cell foams are dipped, sprayed or treated in the acid or alkaline solutions for a short period of the order of seconds or a minute at most and the diaphragms are dissolved. The open celled foam is worked with water to remove the reagent.

Accordingly, the method of the present invention satisfies prior art problems existing with polyurethane foams having small and/or non-uniformed sized cells. The method of the present invention provides an open or closed large-celled polyether-urethane foam having controlled large cells (5 to 20 cells per inch) with very good hydrolytic stability which foam may be used as filters for internal combustion engines, furnaces, air conditioners, water conditioners, in anti-mist devices as seating material for outdoor furniture, as storage means for jellied fuels such as gasoline, and as packing in water cooling towers.

Various modifications may be made within the spirit of this invention.

What is claimed is:

1. The large-celled polyether-polyurethane foam having an average number of cells per lineal inch of from 5 to not more than 20 derived by reacting (1) from about 30 to 70 parts of a polyether polyl having a molecular weight ranging from about 800 to 3000, (2) from about 30 to 70 parts of a polyether polyol having a mo- of from 62 to about 195, (3) from 12 to 80 parts of a combination of isocyanates including at least one tolylene diisocyanate selected from the group consisting of 2,4- and 2,6-tolylene diisocyanate and a polycyclic aromatic polyisocyanate, (4) a catalyst including at least one catalyst containing an organic amine and at least one metllic salt satalyst in a total amount up to about 2 parts, (5) from about 2 to 20 parts of an organic aliphatic carboxylic acid having at least 10 carbon atoms and being soluble in the reactants under the conditions of reaction, (6) a blowing agent selected from at least one of the group consisting of water and halogenated aliphatic compound; (7) from about 0.006 to about 0.03 parts per 100 parts of reactants of a polysiloxane surfactant with substituents on silicon being selected only from at least one of the group consisting of olkyl and aryl radicals; and the ratio of the sum of the equivalents of active hydrogen compounds to the sum of the equivalents of the isocyanates is between 0.8 and 1.2.

2. A large-celled polyether-urethane foam comprising a three-dimensional network of ligaments of polyether-urethane resin, the ligaments being integrally inter-connected at spaced nexuses to form discrete cells defined by the network, sets of adjacent, interconnected ligaments forming planar openings between adjacent cells and the average number of cells per lineal inch of the foam being in the range of from five to not more than twenty, the foam derived by reacting (1) from about 30 to 70 parts of a polyether polyol having a molecular weight ranging from about 800 to 3000, (2) from about 3 to 10 parts of a polyol having a molecular weight of from about 62 to about 195, (3) from 12 to 80 parts of a combination of isocyanates including at least one tolylene diisocyanate selected from the group consisting of 2,4- and 2,6-tolylene diisocyanates and a polycyclic aromatic polyisocyanate, (4) catalysts including at least one catalyst containing an organic amine and at least one metallic salt catalyst in a total amount up to about 2 parts, (5) from about 2 to 20 parts of an organic aliphatic carboxylic acid having at least 10 carbon atoms and being soluble in the ractants under the conditions of reaction, (6) a blowing agent selected from at least one of the group consisting of water and halogenated aliphatic compound; (7) from about 0.006 to about 0.03 parts per 100 parts of reactants of a polysiloxane surfactant with substituents on silicon being selected only from at least one of the group consisting of alkyl and aryl radicals; and the ratio of the sum of the equivalents of active hydrogen compounds to the sum of the equivalents of the isocyanates is between 0.8 and 1.2.

3. The polyurethane foam of claim 1 in which the isocyanate solution also includes 2 to 20 parts of polymethylene polyphenyl isocyanate.

4. The polyurethane foam of claim 1 in which the organic carboxylic acid is a polybasic acid.

5. The polyurethane foam of claim 1 in which the amine type catalyst is N-ethylmorpholine.

6. The polyurethane foam of claim 1 in which the metallic salt catalyst is stannous octoate.

7. The polyurethane foam of claim 1 in which the blowing agent is water.

8. The polyurethane foam of claim 1 in which the first polyol is polyoxypropylene triol.

9. The polyurethane foam of claim 1 in which the second polyol is ethylene glycol.

10. The polyurethane foam of claim 1 in which up to 0.1 part of a silicone surfactant is added to the mixture.

11. The polyurethane foam of claim 1 in which the thin walled membrane of the foam is removed, leaving openings between adjacent cells.

References Cited

UNITED STATES PATENTS

| | | | |
|---|---|---|---|
| 2,956,968 | 10/1960 | Swann et al. | 260—21 |
| 3,095,386 | 6/1963 | Hudson | 260—2.5 |
| 3,149,000 | 9/1964 | Beicos | 117—98 |
| 3,165,483 | 1/1965 | Gemeinhardt et al. | 260—2.5 |
| 3,178,300 | 4/1965 | Gemeinhardt et al. | 106—122 |
| 3,194,773 | 7/1965 | Hostettler | 260—2.5 |
| 3,325,338 | 5/1967 | Geen | 161—89 |
| 3,341,463 | 9/1967 | Gemeinhardt et al. | 252—182 |
| 3,386,927 | 6/1968 | Rosencrans et al. | 260—2.5 |

OTHER REFERENCES

Saunders et al., "Polyurethanes, Part II," Interscience Pub., © 1964, pp. 7, 43–45, and 67–69.

DONALD E. CZAJA, Primary Examiner

MICHAEL B. FEIN, Assistant Examiner

U.S. Cl. X.R.

210—71